US012398349B2

(12) United States Patent
Piorkowski et al.

(10) Patent No.: US 12,398,349 B2
(45) Date of Patent: Aug. 26, 2025

(54) POWDERED CLEANING COMPOSITION HAVING IMPROVED DISSOLUTION

(71) Applicant: Henkel AG & Co. KGaA, Duesseldorf (DE)

(72) Inventors: Daniel Thomas Piorkowski, Fairfield, CT (US); Dylan Robbins, Stamford, CT (US)

(73) Assignee: Henkel AG & Co. KGaA, Düesseldorf (DE)

( * ) Notice: Subject to any disclaimer, the term of this patent is extended or adjusted under 35 U.S.C. 154(b) by 217 days.

(21) Appl. No.: 17/444,027

(22) Filed: Jul. 29, 2021

(65) Prior Publication Data

US 2023/0042815 A1 Feb. 9, 2023

(51) Int. Cl.

| | |
|---|---|
| ***C11D 1/22*** | (2006.01) |
| ***C11D 1/14*** | (2006.01) |
| ***C11D 1/28*** | (2006.01) |
| ***C11D 1/29*** | (2006.01) |
| ***C11D 1/72*** | (2006.01) |
| ***C11D 3/04*** | (2006.01) |
| ***C11D 3/10*** | (2006.01) |
| ***C11D 3/12*** | (2006.01) |
| ***C11D 3/14*** | (2006.01) |
| ***C11D 3/20*** | (2006.01) |
| ***C11D 3/22*** | (2006.01) |
| ***C11D 17/00*** | (2006.01) |
| ***C11D 17/04*** | (2006.01) |

(52) U.S. Cl.

CPC ............ *C11D 17/0056* (2013.01); *C11D 1/14* (2013.01); *C11D 1/28* (2013.01); *C11D 1/29* (2013.01); *C11D 1/72* (2013.01); *C11D 3/046* (2013.01); *C11D 3/10* (2013.01); *C11D 3/126* (2013.01); *C11D 3/14* (2013.01); *C11D 3/2075* (2013.01); *C11D 3/2079* (2013.01); *C11D 3/2082* (2013.01); *C11D 3/2086* (2013.01); *C11D 3/221* (2013.01); *C11D 17/0073* (2013.01); *C11D 17/041* (2013.01); *C11D 2111/24* (2024.01)

(58) Field of Classification Search

CPC .... C11D 1/14; C11D 1/29; C11D 1/22; C11D 3/046; C11D 3/10; C11D 3/14; C11D 3/2075; C11D 3/2082; C11D 3/2086; C11D 17/046; C11D 17/0073; C11D 17/041

USPC ................ 510/191, 426, 434, 477, 488, 446

See application file for complete search history.

(56) References Cited

U.S. PATENT DOCUMENTS

| | | | |
|---|---|---|---|
| 7,065,825 B2 | 6/2006 | Minkler et al. | |
| 7,127,768 B2 | 10/2006 | Blum et al. | |
| 7,146,676 B2 | 12/2006 | Kubes et al. | |
| 7,159,265 B2 | 1/2007 | Soller et al. | |
| 7,232,364 B2 | 6/2007 | Hibbard | |
| 7,650,663 B2 | 1/2010 | Michaels et al. | |
| 7,827,648 B2 | 11/2010 | Soller et al. | |
| 9,408,521 B2 | 8/2016 | Molinet et al. | |
| 2016/0106274 A1 | 4/2016 | Eun | |
| 2018/0296043 A1 | 10/2018 | Meier et al. | |
| 2021/0171881 A1 * | 6/2021 | Colclasure | C11D 3/2086 |

FOREIGN PATENT DOCUMENTS

| | | | | |
|---|---|---|---|---|
| EP | 271992 | * | 6/1988 | |
| EP | 2138562 A1 | * | 12/2009 | C11D 1/02 |
| EP | 2801609 A1 | * | 11/2014 | C11D 1/12 |
| WO | WO-2005061689 A1 | * | 7/2005 | C11D 17/0073 |
| WO | WO-2009004294 A1 | * | 1/2009 | C11D 17/046 |
| WO | WO-2015098265 A1 | * | 7/2015 | C11D 1/37 |

* cited by examiner

*Primary Examiner* — Gregory R Delcotto

(74) *Attorney, Agent, or Firm* — Blank Rome LLP

(57) ABSTRACT

A powdered cleaning composition includes at least one acid chosen from citric acid, glycolic acid, and combinations thereof and present in an amount of from about 1 to about 30 wt % actives based on a total weight of the composition, at least one anionic surfactant present in an amount of from about 5 to about 50 wt % actives based on a total weight of the composition, and at least two fillers chosen from a salt, a sugar, and a clay and present in a total amount of from about 10 to about 80 wt % actives based on a total weight of the composition, wherein the composition comprises water in an amount of less than about 15 wt % based on a total weight of the composition, and wherein the composition has a dissolution percentage of at least about 12% after about 5 minutes in water at about 25° C.

8 Claims, No Drawings

POWDERED CLEANING COMPOSITION HAVING IMPROVED DISSOLUTION

TECHNICAL FIELD OF THE INVENTION

The present disclosure generally relates to a powdered cleaning composition that includes at least one acid, at least one anionic surfactant, and at least two particular fillers such that the composition has improved dissolution in water. More specifically, this disclosure relates to use of at least two fillers chosen from a salt, a sugar, and a clay in conjunction with acids and surfactants to unexpectedly improve dissolution of the composition in water and also allow the composition to be formed into a tablet with unexpectedly improved structural integrity and hardness.

BACKGROUND OF THE INVENTION

There are several single-use toilet bowl cleaners available to the consumer. However, none fully dissolve after use in the toilet bowl. Some cleaners do not dissolve in the toilet bowl, cannot be flushed, and must be discarded in the trash. This presents numerous inconveniences to the consumer and can damage sewer and septic systems if accidently flushed. Other cleaners do not dissolve in the toilet bowl and can be flushed. However, the consumer is then relying on the dissolvability of these products in the septic or sewer system. Again, this can present inconveniences for the consumer. In addition, some of the aforementioned products can scratch the toilet bowl and can break apart prematurely without dissolution. Accordingly, there remains an opportunity for improvement. Many desirable features and characteristics of the present disclosure will become apparent from the subsequent detailed description of the disclosure and the appended claims, taken in conjunction with this background of the disclosure.

BRIEF SUMMARY OF THE INVENTION

This disclosure provides a powdered cleaning composition having improved dissolution in water and comprising: at least one acid chosen from citric acid, glycolic acid, and combinations thereof and present in an amount of from about 1 to about 30 wt % actives based on a total weight of the composition, at least one anionic surfactant present in an amount of from about 5 to about 50 wt % actives based on a total weight of the composition, and at least two fillers chosen from a salt, a sugar, and a clay and present in a total amount of from about 10 to about 80 wt % actives based on a total weight of the composition, wherein the composition comprises water in an amount of less than about 15 wt % based on a total weight of the composition, and wherein the composition has a dissolution percentage of at least about 12% after about 5 minutes in water at about 25° C.

This disclosure also provides a tablet comprising citric acid present in an amount of from about 1 to about 30 wt % actives based on a total weight of the composition, at least one anionic surfactant present in an amount of from about 5 to about 50 wt % actives based on a total weight of the composition, and at least two of: bentonite present in an amount of from about 0 to about 40 wt % actives based on a total weight of the composition, sodium chloride present in an amount of from about 0 to about 40 wt % actives based on a total weight of the composition, and sucrose present in an amount of from about 0 to about 40 wt % actives based on a total weight of the composition, wherein the composition comprises water in an amount of less than about 15 wt % based on a total weight of the composition; wherein the tablet has a hardness of at least about 20 N; and wherein the tablet has a dissolution percentage of at least about 12% after about 5 minutes in water at about 25° C.

The composition and tablet described above alleviate fear of flushing solid material and enables a consumer to clean a surface and observe the powder dissolve after use. The composition and tablet include ratios of a surfactant, acid (for biocidal effects) and at least two fillers which surprisingly contribute to improved dissolution rate, a strong structural integrity to minimize premature cracking during shipment and use, excellent foaming as an indication of cleaning efficacy, resistance to significant humidity abuse.

DETAILED DESCRIPTION OF THE INVENTION

The following detailed description is merely exemplary in nature and is not intended to limit the powdered composition or tablet described herein. Furthermore, there is no intention to be bound by any theory presented in the preceding background or the following detailed description.

Embodiments of the present disclosure are generally directed to powdered compositions and tablets and methods for fabricating the same. For the sake of brevity, conventional techniques related to such compositions and tablets may not be described in detail herein. Moreover, the various tasks and process steps described herein may be incorporated into a more comprehensive procedure or process having additional steps or functionality not described in detail herein. In particular, various steps in the manufacture of such compositions and tablets are well-known and so, in the interest of brevity, many conventional steps will only be mentioned briefly herein or will be omitted entirely without providing the well-known process details.

The powdered cleaning composition is not particularly limited in terms of use and may be used to clean a surface such as a kitchen or bathroom surface including, but not limited to, countertops, appliances, showers, baths, sinks, toilets, bidets, fixtures, tile, grout, granite, glass, mirrors, stone, acrylic, formica, quartz, wood, plastic, metal, and the like. In one embodiment, the powdered cleaning composition is a toilet bowl cleaning composition. In another embodiment, the powdered cleaning composition is a cleaning puck that may be attached to a wand to clean toilets or any surface.

Powdered Cleaning Composition:

The powdered cleaning composition of this disclosure comprises at least one acid, at least one anionic surfactant, and at least two fillers.

In one embodiment, the powdered cleaning composition of this disclosure consists essentially of at least one acid, at least one anionic surfactant, and at least two fillers.

In another embodiment, the powdered cleaning composition of this disclosure consists of at least one acid, at least one anionic surfactant, and at least two fillers.

In other embodiments, the powdered cleaning composition of this disclosure comprises at least one acid chosen from citric acid, glycolic acid, and combinations, at least one anionic surfactant, and at least two fillers chosen from a salt, a sugar, and a clay.

In one embodiment, the powdered cleaning composition of this disclosure consists essentially of at least one acid chosen from citric acid, glycolic acid, and combinations, at least one anionic surfactant, and at least two fillers chosen from a salt, a sugar, and a clay.

In another embodiment, the powdered cleaning composition of this disclosure consists of at least one acid chosen from citric acid, glycolic acid, and combinations, at least one anionic surfactant, and at least two fillers chosen from a salt, a sugar, and a clay.

In other embodiments, the powdered cleaning composition of this disclosure comprises citric acid, at least one anionic surfactant, and sodium chloride, sucrose, and bentonite.

In one embodiment, the powdered cleaning composition of this disclosure consists essentially of citric acid, at least one anionic surfactant, and sodium chloride, sucrose, and bentonite.

In another embodiment, the powdered cleaning composition of this disclosure consists of citric acid, at least one anionic surfactant, and sodium chloride, sucrose, and bentonite.

In various embodiments that include the terminology "consisting essentially of", the composition may be free of, or include less than about 5, 4, 3, 2, 1, 0.5, or 0.1, wt %, of any one or more surfactants, salts, clays, acids, bases, additives, etc., as appreciated by one of skill in the art.

The composition is considered a powder because it includes water in an amount of less than about 15 wt % based on a total weight of the composition. In various embodiments, the composition include water in an amount of less than about 15, 14, 13, 12, 11, 10, 9, 8, 7, 6, 5, 4, 3, 2, or 1, wt % based on a total weight of the composition. This may be alternatively described as percent moisture. In various non-limiting embodiments, all values, both whole and fractional, between and including all of the above, are hereby expressly contemplated for use herein.

The composition may also have a water activity of from about zero to about 0.6, about 0 to about 0.5, about 0 to about 0.4, about 0 to about 0.3, about 0 to about 0.2, about 0 to about 0.1, about 0.2 to about 0.6, about 0.2 to about 0.5, about 0.2 to about 0.4, about 0.2 to about 0.3, or less than about 0.6, 0.5, 0.4, 0.3, 0.2, or 0.1. In various non-limiting embodiments, all values, both whole and fractional, between and including all of the above, are hereby expressly contemplated for use herein.

Water activity can be measured at 25° C. with an Aqua Lab 4TEV DUO (water activity meter) on the capacitance setting. The water activity of a composition is defined as the partial pressure of water in the composition divided by the saturation pressure of water at the temperature of the composition. If no temperature is specified, the default temperature is room temperature. The water activity can be determined by placing a sample in a container which is then sealed, and after equilibrium is reached, determining the relative humidity above the sample. The water activity is calculated from the equilibrium relative humidity according to the following equation:

$$\text{Water activity}(Aw)=(\text{Equilibrium relative humidity})/100$$

As is known in the art, water activity is not the same as percent moisture in a sample. Water activity generally described unbound free bulk water that is available to undergo reaction.

In various embodiments, the composition has a dissolution percentage of at least about 5, 10, 12, or 15% after about 5 minutes in water at about 25° C. In various embodiments, the dissolution percentage is at least about 15, 20, 25, 30, 35, 40, 45, 50, 55, 60, 65, 70, 75, 80, 85, 90, or 95, % after about 5 minutes in water at about 25° C. This can be measured after 1, 2, 3, 4, 5, 6, 7, 8, 9, or 10 minutes, or more. Moreover, dissolution is typically determined by determining a first weight (initial weight), then submerging the composition in water at the desired temperature and for the desired time, then the composition is removed, e.g. filtered or strained or a tablet is removed, dried for 12 hours and then weighed (final weight). The % dissolved is calculated by taking [initial weight minus final weight] divided by initial weight. In various non-limiting embodiments, all values, both whole and fractional, between and including all of the above, are hereby expressly contemplated for use herein.

At Least One Acid:

The composition includes at least one acid as described above. In various embodiments, this acid is not particularly limited and may be any organic or inorganic acid. In other embodiments, the acid is chosen from citric acid, glycolic acid, and combinations thereof. The acid may be citric acid to the exclusion of other acids such as glycolic acid. Alternatively, the acid may be glycolic acid to the exclusion of other acids such as citric acid.

The at least one acid is not particularly limited in terms of amounts in the composition. In various embodiments, the at least one acid is present in an amount of from about 1 to about 30 wt % actives based on a total weight of the composition. In other embodiments, the at least one acid is present in an amount of from about 1 to about 10, about 2 to about 9, about 3 to about 8, about 4 to about 7, or about 5 to about 6, wt % actives based on a total weight of the composition. In still other embodiments, glycolic acid may be present in an amount of from about 1 to about 7, about 2 to about 6, about 3 to about 5, or about 4 to about 5, wt % actives based on a total weight of the composition. In other embodiments, the acid is present in an amount of from about 5 to about 30, about 10 to about 25, or about 15 to about 20, wt % actives based on a total weight of the composition. For example, citric acid may be acid present in an amount of from about 5 to about 30, about 10 to about 25, or about 15 to about 20, wt % actives based on a total weight of the composition. In one embodiment, the at least one acid is present in an amount of from about 1 to about 7 wt % actives based on a total weight of the composition if the acid comprises glycolic acid or about 5 to about 30 wt % actives based on a total weight of the composition if the acid comprises citric acid. In various non-limiting embodiments, all values, both whole and fractional, between and including all of the above, are hereby expressly contemplated for use herein.

At Least One Anionic Surfactant:

The composition also includes at least one anionic surfactant as first introduced above. The at least one anionic surfactant is not particularly limited and may be any known in the art.

In one embodiment, the anionic surfactant is or includes an alcohol ethoxy sulfate. The alcohol ethoxy sulfate typically has a C8-C20 backbone that is ethoxylated with from about 1 to about 10 moles of ethylene oxide. Alternatively, the alcohol ethoxy sulfate may be described as having a C8-C20 backbone and about 1 to 10 moles of ethylene oxide units bonded thereto. The backbone may have any number of carbon atoms from 8 to 20, e.g. 10 to 18, 12 to 16, 12 to 14, 14 to 16, or 8, 9, 10, 11, 12, 13, 14, 15, 16, 17, 18, 19, or 20, carbon atoms. Various mixtures of alcohol ethoxy sulfates may also be used wherein different length backbones are utilized. The backbone is ethoxylated with from about 1 to about 10, about 2 to about 9, about 3 to about 8, about 4 to about 7, about 5 to about 6, or 1, 2, 3, 4, 5, 6, 7, 8, 9, or 10, moles of ethylene oxide. In various non-limiting embodiments, all values, both whole and fractional, between and including all of the above, are hereby expressly contemplated for use herein.

In various embodiments, the alcohol ethoxy sulfate is further defined as sodium laureth sulfate (SLES) having the formula: $CH_3(CH_2)_{10}CH_2(OCH_2CH_2)_nOSO_3Na$ wherein n is from about 1 to about 10. In another embodiment, the alcohol ethoxy sulfate is sodium laureth sulfate ethoxylated with about 2 to about 4 moles of ethylene oxide. In various non-limiting embodiments, all values, both whole and fractional, between and including all of the above, are hereby expressly contemplated for use herein.

In one embodiment, the anionic surfactant is or includes a linear alkylbenzene sulfonate (LAS) may be utilized. The linear alkylbenzene sulfonate may have a linear alkyl chain that has, e.g. 10 to 13 carbon atoms. These carbon atoms are present in approximately the following mole ratios C10:C11:C12:C13 is about 13:30:33:24 having an average carbon number of about 11.6 and a content of the most hydrophobic 2-phenyl isomers of about 18-29 wt %. The linear alkylbenzene sulfonate may be any known in the art. In various non-limiting embodiments, all values, both whole and fractional, between and including all of the above, are hereby expressly contemplated for use herein.

Additional anionic surfactants may include soaps which contain sulfate or sulfonate groups, including those with alkali metal ions as cations, can be used. Usable soaps include alkali metal salts of saturated or unsaturated fatty acids with 12 to 18 carbon (C) atoms. Such fatty acids may also be used in incompletely neutralized form.

In various embodiments, the at least one anionic surfactant is chosen from sodium xylene sulphonate, sodium dodecylbenzenesulfonate, sodium C14-C16 alpha olefin sulfonate, sodium cocosulfate, sodium lauryl sulfate, sodium cocoyl isethionate, sodium olefin sulphonate, and combinations thereof.

The at least one anionic surfactant is not particularly limited in terms of amounts in the composition. In various embodiments, the at least one anionic surfactant is present in an amount of from about 5 to about 50 wt % actives based on a total weight of the composition. In other embodiments, this amount is from about 10 to about 45, about 15 to about 40, about 20 to about 35, about 25 to about 30, about 7 to about 20, about 7 to about 15, about 7 to about 12, about 7 to about 10, about 10 to about 20, or about 10 to about 15, wt % actives based on a total weight of the composition. In one embodiment, the at least one anionic surfactant is present in an amount of from about 7 to about 20 wt % actives based on a total weight of the composition. In various non-limiting embodiments, all values, both whole and fractional, between and including all of the above, are hereby expressly contemplated for use herein.

Additional Surfactants:

In other embodiments, one or more additional surfactants may be utilized and may be or include cationic, anionic, non-ionic, and/or zwitterionic surfactants, and/or combinations thereof. Alternatively, the composition may be free of one or more of such additional surfactants.

In various embodiments, an alkoxylated alcohol is utilized. The alkoxylated alcohol may be a $C_8$-$C_{20}$ alcohol that is capped with (or comprises) approximately 2 to 12 moles of an alkylene oxide. In other embodiments, the alkoxylated alcohol may be an alcohol alkoxylate that has from 8 to 20, 10 to 18, 12 to 16, or 12 to 14, carbon atoms and is an ethoxylate, propoxylate, or butoxylate and is capped with an alkylene oxide, e.g. ethylene oxide, propylene oxide, or butylene oxide. The alcohol alkoxylate may be capped with varying numbers of moles of the alkylene oxide, e.g. about 2 to about 12, about 3 to about 11, about 4 to about 10, about 5 to about 9, about 6 to about 8, or about 7 to about 8, moles. In various non-limiting embodiments, all values, both whole and fractional, between and including all of the above, are hereby expressly contemplated for use herein.

In one embodiment, the surfactants utilized include an alcohol ethoxy sulfate that is sodium laureth sulfate ethoxylated with about 2 to about 4 moles of ethylene oxide, a linear alkyl benzenesulfonate that has a linear alkyl chain that has from about 10 to about 13 carbon atoms, and an alkoxylated alcohol that is an ethoxylated alcohol comprising a $C_8$-$C_{20}$ backbone that is ethoxylated with from about 2 to about 12 moles of ethylene oxide. In various non-limiting embodiments, all values, both whole and fractional, between and including all of the above, are hereby expressly contemplated for use herein.

In another embodiment, the surfactants utilized include an alcohol ethoxy sulfate that is sodium laureth sulfate ethoxylated with about 2 to about 4 moles of ethylene oxide, an alkoxylated alcohol that is a C12-C15 alcohol ethoxylate that is capped with approximately 7 moles of ethylene oxide; and a linear alkyl benzenesulfonate that is optionally 2-Phenyl Sulfonic Acid. In various non-limiting embodiments, all values, both whole and fractional, between and including all of the above, are hereby expressly contemplated for use herein.

Additional usable ionic surfactants of the sulfate type include the salts of sulfuric acid semi esters of fatty alcohols with 12 to 18 C atoms. Usable ionic surfactants of the sulfonate type include alkane sulfonates with 12 to 18 C atoms and olefin sulfonates with 12 to 18 C atoms, such as those that arise from the reaction of corresponding monoolefins with sulfur trioxide, alpha-sulfofatty acid esters such as those that arise from the sulfonation of fatty acid methyl or ethyl esters. In various non-limiting embodiments, all values, both whole and fractional, between and including all of the above, are hereby expressly contemplated for use herein.

Other suitable examples of additional nonionic surfactants include alkyl glycosides and ethoxylation and/or propoxylation products of alkyl glycosides or linear or branched alcohols in each case having 12 to 18 carbon atoms in the alkyl moiety and 3 to 20, or 4 to 10, alkyl ether groups. Corresponding ethoxylation and/or propoxylation products of N-alkylamines, vicinal diols, and fatty acid amides, which correspond to the alkyl moiety in the stated long-chain alcohol derivatives, may furthermore be used. Alkylphenols having 5 to 12 carbon atoms may also be used in the alkyl moiety of the above described long-chain alcohol derivatives. In various non-limiting embodiments, all values, both whole and fractional, between and including all of the above, are hereby expressly contemplated for use herein.

In other embodiments, the additional surfactant is chosen from nonionic and ionic surfactants, such as alkoxylates, polyglycerols, glycol ethers, glycols, polyethylene glycols, polypropylene glycols, polybutylene glycols, glycerol ester ethoxylates, polysorbates, alkyl ether sulfates, alkyl- and/or arylsulfonates, alkyl sulfates, ester sulfonates (sulfo-fatty acid esters), ligninsulfonates, fatty acid cyanamides, anionic sulfosuccinic acid surfactants, fatty acid isethionates, acylaminoalkane-sulfonates (fatty acid taurides), fatty acid sarcosinates, ether carboxylic acids and alkyl(ether)phosphates. In such embodiments, suitable nonionic surfactants include $C_2$-$C_6$-alkylene glycols and poly-$C_2$-$C_3$-alkylene glycol ethers, optionally, etherified on one side with a $C_1$-$C_6$-alkanol and having, on average, 1 to 9 identical or different, typically identical, alkylene glycol groups per molecule, and also alcohols and fatty alcohol polyglycol ethers, typically propylene glycol, dipropylene glycol, trimethylolpropane, and fatty alcohols with low degrees of ethoxylation having 6 to 22, typically 8 to 18, more typically 8 to 12, and even more typically 8 to 11, carbon atoms. Moreover, suitable ionic surfactants include alkyl ether sulfates, sulfosuccinic acid surfactants, polyacrylates and phosphonic acids, typically lauryl sulfate, lauryl ether sulfate, sodium sulfosuccinic acid diisooctyl ester, 1-hydroxyethane-1,1-diphosphonic acid, and diacetyltartaric esters. In various non-limiting embodiments, all values, both whole and fractional, between and including all of the above, are hereby expressly contemplated for use herein. In various non-limiting embodiments, all values, both whole and fractional, between and including all of the above, are hereby expressly contemplated for use herein.

At Least Two Fillers

The composition also includes at least two fillers, as first introduced above. The at least two fillers are not particularly limited herein. In various embodiments, the at least two fillers are chosen from a salt, a sugar, and a clay. For example, the at least two fillers may include, be, consist essentially of, or consist of:

one or more salts+one or more sugars+one or more clays; or one or more salts+one or more sugars, in the absence of one or more clays; or one or more salts+one or more clays, in the absence of one or more sugars; or one or more sugars+one or more clays, in the absence of one or more salts.

The at least two fillers are present in a total amount of from about 10 to about 80 wt % actives based on a total weight of the composition. In various embodiments, this amount is from about 15 to about 75, about 20 to about 70, about 25 to about 65, about 30 to about 60, about 35 to about 55, about 40 to about 50, about 45 to about 50, about 40 to about 70, about 45 to about 65, about 50 to about 60, or about 55 to about 60, wt % actives based on a total weight of the composition. It is contemplated that each of the fillers independently can be present in an amount of from about 0 up to almost 80 wt % actives, so long as at least two fillers are utilized. In various embodiments, each of the fillers may be independently present in an amount of from about 1 to about 10, about 2 to about 9, about 3 to about 8, about 4 to about 7, about 5 to about 6, about 1 to about 80, about 5 to about 75, about 10 to about 70, about 15 to about 65, about 20 to about 60, about 25 to about 55, about 30 to about 50, about 35 to about 45, or about 35 to about 40, wt % actives based on a total weight of the composition. In one embodiment, the at least two fillers are present in a total amount of from about 40 to about 70 wt % actives based on a total weight of the composition. In various non-limiting embodiments, all values, both whole and fractional, between and including all of the above, are hereby expressly contemplated for use herein.

Salt:

The salt is not particularly limited and may be any known in the art, e.g. any organic or inorganic salt. In various embodiments, the salt is an organic salt. In other embodiments, the salt is an inorganic salt. In other embodiments, the salt is a alkaline or alkaline earth metal salt. In other embodiments, the salt is a halogenated salt, such as a chloride. In other embodiments, the salt is a sulfate, a carbonate, an acetate, a tartrate, a lactate, etc. For example, the salt may be chosen from sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, and combinations thereof. In one embodiment, the salt is sodium chloride.

Sugar:

The sugar is also not particularly limited and may be any known in the art. The sugar may be a mono- or di-saccharide. In various embodiments, the sugar is chosen from fructose, galactose, glucose, dextrose, and combinations thereof. In other embodiments, the sugar is chosen from lactose, maltose, sucrose, and combinations thereof. In other embodiments, the sugar is chosen from dextrose, fructose, galactose, isoglucose, glucose, sucrose, raffinose, isomalt, xylitol, and combinations thereof. In one embodiment, the sugar is sucrose.

Clay:

The clay is also not particularly limited and may be any known in the art. The clay may be chosen from Bentonite clay, Beidellite clay, Hectorite clay, Laponite clay, Montmorillonite clay, Nontronite clay, Saponite clay, Sauconite clay, and combinations thereof. In one embodiment, the clay is Bentonite clay.

In one embodiment, the clay is Bentonite clay, the salt is sodium chloride, and the sugar is sucrose. In another embodiment, the clay, the salt, and the sugar are present in a weight ratio of actives of about (0 to 4):about (0 to 4):about (0 to 4), so long as at least two are present. In another embodiment, the clay is Bentonite clay, the salt is sodium chloride, and the sugar is sucrose and the clay, salt, and sugar are present in a weight ratio of actives of about (1 to 4):about (1 to 4):about (1 to 4). For example, each of the terms in the ratio may independently be 1, 2, 3, or 4, or any fractional value thereof. In another embodiment, the clay is Bentonite clay, the salt is sodium chloride, and the sugar is sucrose, and each is independently present in an amount of from about 7 to about 40, about 10 to about 35, about 15 to about 30, or about 20 to about 25, wt % actives based on a total weight of the composition. In various non-limiting embodiments, all values, both whole and fractional, between and including all of the above, are hereby expressly contemplated for use herein.

In various embodiments, the weight ratio of actives of the acid to surfactant to filler is About (1 to 6):About (5 to 50):About (2 to 80). For example, the ratio may be as follows:

About 1:About 5:About 80;

About 6:About 1:About 2; or

About 1:About 50:About 10.

Again, each of the terms in the ratio may independently be any value or range of values, both whole and fractional, between and including (1 to 6), (5 to 50), and/or (2 to 80). In other words, all possibilities of the aforementioned ratios are hereby expressly contemplated for use herein in various non-limiting embodiments.

Non-Aqueous Solvent

In some embodiments, the composition may include, or may be free of, a non-aqueous solvent. In various embodiments, the non-aqueous solvent is present in an amount of less than about 15 wt % based on a total weight of the composition. In various embodiments, the composition include water in an amount of less than about 15, 14, 13, 12, 11, 10, 9, 8, 7, 6, 5, 4, 3, 2, or 1, wt % based on a total weight of the composition. In various non-limiting embodiments, all values, both whole and fractional, between and including all of the above, are hereby expressly contemplated for use herein.

The non-aqueous solvent is not particularly limited and may be any known in the art. In various embodiments, the non-aqueous solvent is chosen from glycerol (glycerin), propylene glycol, ethylene glycol, ethanol, and 4C+ compounds. The term "4C+ compound" refers to one or more of: polypropylene glycol; polyethylene glycol esters such as polyethylene glycol stearate, propylene glycol laurate, and/or propylene glycol palmitate; methyl ester ethoxylate; diethylene glycol; dipropylene glycol; tetramethylene glycol; butylene glycol; pentanediol; hexylene glycol; heptylene glycol; octylene glycol; 2-methyl, 1,3 propanediol; triethylene glycol; polypropylene glycol; glycol ethers, such as ethylene glycol monobutyl ether, diethylene glycol monobutyl ether, triethylene glycol monobutyl ether, ethylene glycol monopropyl ether, diethylene glycol monoethyl ether, triethylene glycol monoethyl ether, diethylene glycol monomethyl ether, and triethylene glycol monomethyl ether; tris (2-hydroxyethyl)methyl ammonium methylsulfate; ethylene oxide/propylene oxide copolymers with a number average molecular weight of 3,500 Daltons or less; and ethoxylated fatty acids. In other embodiments, the non-aqueous solvent is a relatively low molecular weight polyethylene glycol (PEG) having a weight average molecular weight of less than about 600 Da, e.g. about 400, such as those having a weight average molecular weight of from about 380 to about 420, Da. In other embodiments, PEG 200, PEG 250, PEG 300, PEG 350, PEG 400, PEG 450, PEG 500, PEG 550, and/or PEG 600 (wherein the numerals represent the approximate weight average molecular weight in Daltons) may be used. Other suitable non-aqueous solvents include ethylene oxide/propylene oxide block copolymers. In various non-limiting embodiments, all values, both whole and fractional, between and including all of the above, are hereby expressly contemplated for use herein.

In other embodiments, the composition is free of the non-aqueous solvent.

Additives:

The composition may include one or more of the following additives or may be free of one or more of the following additives. For example, the composition may include one or more foam inhibitors (e.g. defoaming agents). Suitable foam inhibitors include, but are not limited to, fatty acids such as coconut fatty acids. The composition may include the foam inhibitor at an amount of from about 0 to about 10 weight percent, based on the total weight of the composition. In various non-limiting embodiments, all values, both whole and fractional, between and including all of the above, are hereby expressly contemplated for use herein.

Bittering agents may optionally be added to hinder accidental ingestion of the composition. Bittering agents are compositions that taste bad, so children or others are discouraged from accidental ingestion. Exemplary bittering agents include denatonium benzoate, aloin, and others. Bittering agents may be present in the composition at an amount of from about 0 to about 1 weight percent, or an amount of from about 0 to about 0.5 weight percent, or an amount of from about 0 to about 0.1 weight percent in various embodiments, based on the total weight of the composition. In various non-limiting embodiments, all values, both whole and fractional, between and including all of the above, are hereby expressly contemplated for use herein.

In other embodiments, additives may be or include neutralizers/pH adjustors just as monoethanolamine and the like, enzymes, optical brighteners, chelators, and combinations thereof. These additives may be chosen from any known in the art.

The additive may include, or be free of, a cationic polymer including, but not limited to, a copolymer of ((2-methacryloyloxy)ethyl)-trimethyl ammonium chloride, cationic cellulosic polymers, and combinations thereof.

It is further contemplated that the composition can include non-ionic and/or anionic soil release polymer, which may be any known in the art.

In other embodiments, the additive is or includes Sodium Bicarbonate, Hydrophobic Fumed Silica, Magnesium Stearate, hydroxypropyl methylcellulose, and/or combinations thereof.

In one embodiment, the composition is free of, or includes less than about 15, 14, 13, 12, 11, 10, 9, 8, 7, 6, 5, 4, 3, 2, or 1, wt % actives of a solvent other than water, e.g. any organic solvent, non-polar solvent, polar aprotic solvent, polar protic solvent, etc. and combinations thereof, based on a total weight of the composition. In various non-limiting embodiments, all values, both whole and fractional, between and including all of the above, are hereby expressly contemplated for use herein.

Method of Making the Powdered Composition:

The powdered composition is not particularly limited by any particular method of making. For example, any one or more of the components may be combined with any one or more of the components, either in their entire amounts or in more than one individual partial portion. In various embodiments, an acid premix and a base premix are formed and then combined. For example, the acid premix may be or include at least one clay, at least one salt, and at least one acid. Similarly, the base premix may be or include at least one anionic surfactant. Alternatively, the acid premix may be or include any one or more components described herein. Moreover, the base premix may be or include any one or more components described herein. Any one or more components may be included in both the acid and base premixes. Alternatively, any one or more components described herein may be provided independently from any acid and/or base premixes that are utilized. There may be one or more acid premixes utilized and one or more base premixes utilizes. Moreover, there may be one or more acid premixes utilized to the exclusion of one or more base premixes. Similarly, there may be one or more base premixes utilizes to the exclusion of one or more acid premixes.

Method of Cleaning Using the Powdered Composition:

The powdered composition is not particularly limited to use in any particular method of cleaning. In various embodiments, the powdered composition is provided and used to clean a surface such as a kitchen or bathroom surface including, but not limited to, countertops, appliances, showers, baths, sinks, toilets, bidets, fixtures, tile, grout, granite, glass, mirrors, stone, acrylic, formica, quartz, wood, plastic, metal, and the like.

Tablet:

This disclosure also provides a tablet comprising:

citric acid present in an amount of from about 1 to about 30 wt % actives based on a total weight of the composition, at least one anionic surfactant present in an amount of from about 5 to about 50 wt % actives based on a total weight of the composition, and at least two of:

bentonite present in an amount of from about 0 to about 40 wt % actives based on a total weight of the composition, sodium chloride present in an amount of from about 0 to about 40 wt % actives based on a total weight of the composition, and sucrose present in an amount of from about 0 to about 40 wt % actives based on a total weight of the composition, wherein the composition comprises water in an amount of less than about 15 wt % based on a total weight of the composition;

wherein the tablet has a hardness of at least about 20 N; and wherein the tablet has a dissolution percentage of at least about 12% after about 5 minutes in water at about 25° C.

In one embodiment, the Bentonite, sodium chloride, and sucrose are present in a weight ratio of actives of about (1 to 4):about (1 to 4):about (1 to 4). In another embodiment, each of the Bentonite, sodium chloride, and sucrose is independently present in an amount of from about 7 to about 40 wt % actives based on a total weight of the composition. In another embodiment, the tablet consists essentially of the citric acid, the at least one anionic surfactant, the bentonite, the sodium chloride, and the sucrose.

The tablet is not particularly limited in physical dimensions, shape, size etc. In one embodiment, the tablet may be described as a capsule or caplet. Alternatively, the tablet may be described as a briquette, pill, pellet, brick, or sachet. Alternatively, the tablet may be described as a "massive body" which, as is known in the art, refers to a solid shape (typically a porous solid shape) that includes a mixture of particulates. Alternatively, the tablet may be described as having any shape, such as a donut or torus shape, a puck shape that may or may not define a depression therein, or any other shape known in the art.

EXAMPLES

Example 1

The following powdered compositions were compressed into tablets with the following procedure (wet granulation):

- Combine ingredients into two premixes: acid and basic; mix separately until uniform
  - Acid Premix:
    - Bentonite
    - Salt
    - Citric Acid
    - Approximately half of content of hydroxypropyl methylcellulose
  - Basic Premix:
    - Anionic Surfactant
    - Sodium Bicarbonate
    - Approximately half of content of hydroxypropyl methylcellulose
- Add a 10% Ethanol in DI Water solution to separate premixes until powder lumps together
- Grind all powder materials to a fine particle size (in a mortar and pestle)
- Dry in Vacuum Oven for 1-2 hours
- Combine Acid and Basic premixes together with fumed silica through dry blending
- Add magnesium stearate to mixture and dry blend
- Press powder into tablets using approximately 0.4 metric tons force This Example varies the amount of bentonite clay, salt (sodium chloride) and sugar (sucrose) while maintaining (i.e., locking) the same level of acid, bicarbonate, anionic surfactant, fumed silica, magnesium stearate and hydroxypropyl methylcellulose such that they are not variables herein.

The evaluated weight ratios of the sodium chloride, clay and sugar were as followed and comprised 42.48% of final formulas (with the other 57.52% coming from the locked ingredients):

| | Weight Ratio | | |
|---|---|---|---|
| Composition | Bentonite | NaCl | Sucrose |
| Inventive Composition 1 | 0.50 | 0.00 | 0.50 |
| Inventive Composition 2 | 0.17 | 0.17 | 0.67 |
| Inventive Composition 3 | 0.67 | 0.17 | 0.17 |
| Inventive Composition 4 | 0.50 | 0.50 | 0.00 |
| Inventive Composition 5 | 0.33 | 0.33 | 0.33 |
| Comparative Composition 6 | 0.00 | 0.00 | 1.00 |
| Inventive Composition 7 | 0.00 | 0.50 | 0.50 |
| Inventive Composition 8 | 0.17 | 0.67 | 0.17 |
| Comparative Composition 9 | 0.00 | 1.00 | 0.00 |
| Comparative Composition 10 | 1.00 | 0.00 | 0.00 |

The aforementioned Compositions are as follows:

| | Inv. Comp 1 | Inv. Comp 2 | Inv. Comp 3 | Inv. Comp 4 | Inv. Comp 5 |
|---|---|---|---|---|---|
| Bentonite | 21.24 | 7.08 | 28.32 | 21.24 | 14.16 |
| NaCl | 0.00 | 7.08 | 7.08 | 21.24 | 14.16 |
| Sucrose | 21.24 | 28.32 | 7.08 | 0.00 | 14.16 |
| Citric Acid | 14.75 | 14.75 | 14.75 | 14.75 | 14.75 |
| HPMC, 100 cPs | 3.77 | 3.77 | 3.77 | 3.77 | 3.77 |
| Sodium Dodecylbenzene sulfonate (LAS) | 28.4 | 28.4 | 28.4 | 28.4 | 28.4 |
| Sodium Bicarbonate | 9.6 | 9.6 | 9.6 | 9.6 | 9.6 |
| Hydrophobic Fumed Silica | 0.5 | 0.5 | 0.5 | 0.5 | 0.5 |
| Magnesium Stearate | 0.5 | 0.5 | 0.5 | 0.5 | 0.5 |
| Sum no Bulking | 57.52 | 57.52 | 57.52 | 57.52 | 57.52 |
| Total | 100 | 100 | 100 | 100 | 100 |

| | Compar. Comp. 6 | Inv. Comp 7 | Inv. Comp 8 | Compar. Comp. 9 | Compar. Comp. 10 |
|---|---|---|---|---|---|
| Bentonite | 0.00 | 0.00 | 7.08 | 0.00 | 42.48 |
| NaCl | 0.00 | 21.24 | 28.32 | 42.48 | 0.00 |
| Sucrose | 42.48 | 21.24 | 7.08 | 0.00 | 0.00 |
| Citric Acid | 14.75 | 14.75 | 14.75 | 14.75 | 14.75 |
| HPMC, 100 cPs | 3.77 | 3.77 | 3.77 | 3.77 | 3.77 |
| Sodium Dodecylbenzene sulfonate (LAS) | 28.4 | 28.4 | 28.4 | 28.4 | 28.4 |
| Sodium Bicarbonate | 9.6 | 9.6 | 9.6 | 9.6 | 9.6 |
| Hydrophobic Fumed Silica | 0.5 | 0.5 | 0.5 | 0.5 | 0.5 |
| Magnesium Stearate | 0.5 | 0.5 | 0.5 | 0.5 | 0.5 |
| Sum no Bulking | 57.52 | 57.52 | 57.52 | 57.52 | 57.52 |
| Total | 100 | 100 | 100 | 100 | 100 |

After formation of tablets, the tablet strength, dissolution rate, and height were measured as follows.

To determine tablet strength (or hardness), the tablet was placed in a Dr. Schleuniger Pharmatron Model 6D Tablet Tester. The machine's default setting then crushes the tablet and gives a Newton force hardness measure.

To determine solubility, the tablet is first weighed (initial weight), then submerged in water for the desired time (1 or 5 minutes), then the tablet is removed, dried for 12 hours and then weighed (final weight). The % dissolved is calculated by taking [initial weight minus final weight] divided by initial weight.

Height of the tablet was measured with a standard caliper after removal from tablet press.

The following approximate data was obtained:

| Composition | % Tablet Dissolved After 1 Minute | % Tablet Dissolved After 5 Minute | Tablet Height After Formation (mm) | Tablet Strength (N) |
|---|---|---|---|---|
| Inventive Composition 1 | 10% | 22% | 9.5 | 11 |
| Inventive Composition 2 | 12% | 28% | 9.5 | 17 |
| Inventive Composition 3 | 15% | 65% | 9 | 16 |
| Inventive Composition 4 | 41% | 89% | 9.2 | 18 |
| Inventive Composition 5 | 24% | 50% | 9 | 21 |
| Comparative Composition 6 | 13% | 24% | 9.8 | 13 |
| Inventive Composition 7 | 27% | 34% | 9.5 | 14 |
| Inventive Composition 8 | 41% | 72% | 9 | 17 |
| Comparative Composition 9 | 67% | 94% | 8.5 | 15 |
| Comparative Composition 10 | 4% | 22% | 9 | 15 |

Using JMP software, the following R squared, p values and predictive expressions were determined.

| | R Squared | p-value | Predictive Expression |
|---|---|---|---|
| % Dissolution-1 minute | 0.995 | 0.0001 | 0.04*Bentonite + 0.67*NaCl + 0.13*Sucrose + Bentonite*(NaCl*.18) + NaCl*(Sucrose* − 0.57) |
| % Dissolution-5 minute | 0.96 | 0.001 | 0.27*Bentonite + 0.93*NaCl + 0.23*Sucrose + Bentonite*(NaCl*1.37) + NaCl*(Sucrose* − 0.99) |
| Tablet Height | 0.8 | 0.004 | 9.04*Bentonite + 8.71*NaCl + 9.84*Sucrose |
| Tablet Strength | 0.15 | 0.57 | 16*Bentonite + 17.4*NaCl + 13.7*Sucrose |

According to the predictive expressions above:

Bentonite had the smallest impact on immediate dissolution (i.e. 1 minute) versus sodium chloride and sucrose; with a factor of 0.04 versus 0.67 and 0.13, respectively. Sodium chloride had the most positive impact. This data is statistically significant based on the p-value.

At longer term dissolution (i.e. 5 minutes), sodium chloride had the most positive impact versus sucrose and bentonite; with a factor of 0.93 vs. 0.27 and 0.23, respectively. Bentonite's impact on dissolution was more favorable at 5 minutes than 1 minute. This data is statistically significant based on the p-value.

Sucrose had the most positive impact on tablet height vs. bentonite and sodium chloride; with a factor of 9.84 vs. 9.04 and 8.71, respectively. This data is statistically significant based on the p-value.

Bentonite and sodium chloride had the most positive impact on tablet strength; with factors of 16 and 17.4, respectively; vs. 13.7 for sucrose. This data set was not significant, according to the p-value that was above 0.5.

Example 2

Inventive Composition 4 from Example 1 was also used to form tablets under various pressures to see the impact on tablet hardness and height.

The following approximate data was obtained:

| Press Force MT | Height mm | Tablet Strength N |
|---|---|---|
| 0.40 | 10 | 16 |
| 0.80 | 10 | 31 |
| 1.20 | 9 | 59 |
| 1.60 | 9 | 105 |
| 2.20 | 8 | 165 |

A linear relationship was observed for improving tablet strength with increased press force.

Example 3

The tablets from Example 2 were then tested for dissolution at 1 and 5 minutes, the following approximate data was obtained:

| 1 Minute Testing | | | |
|---|---|---|---|
| Press Force MT | Initial Mass grams | Final Mass grams | Mass Loss % |
| 0.4 | 11.27 | 8.72 | 22.63% |
| 0.8 | 11.3 | 9.45 | 16.37% |
| 1.2 | 11.29 | 10.41 | 7.79% |
| 1.6 | 11.28 | 10.63 | 5.76% |
| 2.2 | 11.39 | 10.93 | 4.04% |

| 5 Minute Testing | | | |
|---|---|---|---|
| Press Force MT | Initial Mass grams | Final Mass grams | Mass Loss % |
| 0.4 | 11.29 | 2.95 | 73.87% |
| 0.8 | 11.32 | 3.91 | 65.46% |
| 1.2 | 11.3 | 6.29 | 44.34% |
| 1.6 | 11.36 | 9.34 | 17.78% |
| 2.2 | 11.33 | 9.66 | 14.74% |

The data shows that as press force increased, tablet strength increased but a decrease in dissolution was observed. This observation shows the importance of balancing the ratio of sodium chloride and bentonite as well as press force to get a balance of good dissolution and tablet strength.

Comparing Composition 4's dissolution and strength change from 0.4 MT (force used in for Compositions in Example 1) versus 1.2 MT, dissolution at 5 minutes decreased from 74% to 44%, but strength increased from 16 to 59 N. In Example 1, Composition 10 (only bentonite) pressed at 0.4 MT yielded a dissolution at 5 minutes of 22% and a strength of 15N.

This comparison shows that a blend of sodium chloride and bentonite yielded a surprisingly superior product that could be pressed at a higher force yielding a tablet with more strength (59 N vs. 15N) as well as a higher dissolution rate at the higher strength (44% vs. 22).

Example 4

The following example was created using a direct compression method, which entails simple powder blending of all materials (in a single batch), without premixes or solvent; and then compressing at 1.6 MT into a tablet.

All materials in the formulation were fixed except for the filler, which were adjusted in the formula at the following ratios:

| Composition | Weight Ratio NaCl | Sucrose | Bentonite |
|---|---|---|---|
| Comparative Composition 11 | 1.000 | 0.000 | 0.000 |
| Inventive Composition 12 | 0.167 | 0.667 | 0.167 |
| Inventive Composition 13 | 0.333 | 0.333 | 0.333 |
| Inventive Composition 14 | 0.000 | 0.500 | 0.500 |
| Inventive Composition 15 | 0.667 | 0.167 | 0.167 |
| Inventive Composition 16 | 0.500 | 0.500 | 0.000 |
| Comparative Composition 17 | 0.000 | 1.000 | 0.000 |
| Comparative Composition 18 | 0.000 | 0.000 | 1.000 |
| Inventive Composition 19 | 0.167 | 0.167 | 0.667 |
| Inventive Composition 20 | 0.500 | 0.000 | 0.500 |

The ratios listed above when added with the fixed ingredients (bicarbonate, citric acid, hydroxypropyl methylcellulose, anionic surfactant, silica, stearate) yielded the following formulations:

| | Compar. Comp. 11 | Inv. Comp. 12 | Inv. Comp. 13 | Inv. Comp. 14 | Inv. Comp. 15 |
|---|---|---|---|---|---|
| Citric Acid | 14.75 | 14.75 | 14.75 | 14.75 | 14.75 |
| HPMC, 100 cPs | 3.77 | 3.77 | 3.77 | 3.77 | 3.77 |
| Sodium Cocoyl Isethionate | 12.00 | 12.00 | 12.00 | 12.00 | 12.00 |
| Sodium Bicarbonate | 9.60 | 9.60 | 9.60 | 9.60 | 9.60 |
| Hydrophobic Fumed Silica (Aerosil R 972 from Evonik) | 0.50 | 0.50 | 0.50 | 0.50 | 0.50 |
| NaCl | 58.88 | 9.81 | 19.63 | 0.00 | 39.25 |
| Sucrose | 0.00 | 39.25 | 19.63 | 29.44 | 9.81 |
| Bentonite | 0.00 | 9.81 | 19.63 | 29.44 | 9.81 |
| Magnesium Stearate | 0.50 | 0.50 | 0.50 | 0.50 | 0.50 |
| Sum no Bulking | 15.25 | 15.25 | 15.25 | 15.25 | 15.25 |
| Total | 100.00 | 100.00 | 100.00 | 100.00 | 100.00 |

| | Inv. Comp. 16 | Compar. Comp. 17 | Compar. Comp. 18 | Inv. Comp. 19 | Inv. Comp. 20 |
|---|---|---|---|---|---|
| Citric Acid | 14.75 | 14.75 | 14.75 | 14.75 | 14.75 |
| HPMC, 100 cPs | 3.77 | 3.77 | 3.77 | 3.77 | 3.77 |
| Sodium Cocoyl Isethionate | 12.00 | 12.00 | 12.00 | 12.00 | 12.00 |
| Sodium Bicarbonate | 9.60 | 9.60 | 9.60 | 9.60 | 9.60 |
| Hydrophobic Fumed Silica (Aerosil R 972 from Evonik) | 0.50 | 0.50 | 0.50 | 0.50 | 0.50 |
| NaCl | 29.44 | 0.00 | 0.00 | 9.81 | 29.44 |
| Sucrose | 29.44 | 58.88 | 0.00 | 9.81 | 0.00 |
| Bentonite | 0.00 | 0.00 | 58.88 | 39.25 | 29.44 |
| Magnesium Stearate | 0.50 | 0.50 | 0.50 | 0.50 | 0.50 |
| Sum no Bulking | 15.25 | 15.25 | 15.25 | 15.25 | 15.25 |
| Total | 100.00 | 100.00 | 100.00 | 100.00 | 100.00 |

After formation of tablets, the water activity, tablet strength, dissolution rate, and height were measured.

Water activities were measured at 25° C. with an Aqua Lab 4TEV DUO (water activity meter) on the capacitance setting. The water activity of a composition is defined as the partial pressure of water in the composition divided by the saturation pressure of water at the temperature of the composition. If no temperature is specified, the default temperature is room temperature. The water activity can be determined by placing a sample in a container which is then sealed, and after equilibrium is reached, determining the relative humidity above the sample. The water activity is calculated from the equilibrium relative humidity according to the following equation:

$$\text{Water activity}(Aw)=(\text{Equilibrium relative humidity})/100$$

To determine tablet strength (or hardness), the tablet was placed in a Dr. Schleuniger Pharmatron Model 6D Tablet Tester. The machine's default setting then crushes the tablet and gives a Newton force hardness measure.

To determine solubility, the tablet is first weighed (initial weight), then submerged in water for the desired time (1 or 5 minutes), then the tablet is removed, dried for 12 hours and then weighed (final weight). The % dissolved is calculated by taking [initial weight minus final weight] divided by initial weight.

Height of the tablet was measured with a standard caliper after removal from tablet press.

The following approximate data was obtained:

| Composition | Water Activity aw | Tablet Strength N | Height cm | 5 min Dissolution % |
|---|---|---|---|---|
| Comparative Composition 11 | 0.2114 | 11 | 0.85 | 16.00% |
| Inventive Composition 12 | 0.3905 | 11 | 0.80 | 28.00% |
| Inventive Composition 13 | 0.4352 | 35 | 0.85 | 19.00% |
| Inventive Composition 14 | 0.4508 | 58 | 0.75 | 15.00% |
| Inventive Composition 15 | 0.3997 | 47 | 0.80 | 35.00% |
| Inventive Composition 16 | 0.2046 | 18 | 0.80 | 8.00% |
| Comparative Composition 17 | 0.2034 | 19 | 0.90 | 18.00% |
| Comparative Composition 18 | 0.4741 | 58 | 0.80 | 9.00% |
| Inventive Composition 19 | 0.4617 | 37 | 0.85 | 29.00% |
| Inventive Composition 20 | 0.4530 | 92 | 0.80 | 47.00% |

Using JMP software, the following R squared, p values and predictive expressions were determined.

| | R Squared | p-value | Predictive Expression |
|---|---|---|---|
| % Dissolution-5 minute | 0.83 | 0.1 | 0.09*Bentonite + 0.17*NaCl + 0.2*Sucrose + NaCl*(Sucrose* − 0.29) + NaCl*(Bentonite*1.38) + Sucrose*(Bentonite*0.07) |
| Tablet Strength | 0.99 | 0.1* | 11.4*NaQ + 19.4*Sucrose + 57.9*Bentonite + NaCl*(Sucrose*12.48) + NaCl*(Bentonite*166.6) + Sucrose*(Bentonite* − 213.4) |

*eliminated tablet strength numbers from Compositions 14, 19, 20 due to outliers According to the predictive expressions above:

At longer term dissolution (i.e., 5 minutes), sodium chloride and sucrose had the most positive impact; with a factor of 0.17 and 0.2, respectively, versus bentonite's 0.09. This data is statistically significant based on the p-value.

Bentonite had the most positive impact on tablet strength; with a factor of 58, versus NaCl (11.4) and Sucrose (19.4). This data is statistically significant based on the p-value.

Based on the favorability of each material (Bentonite favorable on Tablet Strength but not dissolution) and Sodium Chloride and Sucrose favorably for dissolution, but not as much on tablet strength, blends of bentonite with sodium chloride or sucrose will yield formulations with favorable dissolution and strength properties.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A tablet comprising:

citric acid present in an amount of about 14.8 wt % actives, based on the total weight of the tablet;

an anionic surfactant that is either (1) sodium dodecylbenzene sulfonate present in an amount of about 28 wt % actives, based on the total weight of the tablet, or (2) sodium cocoyl isethionate present in an amount of about 12 wt % actives, based on the total weight of the tablet;

bentonite clay present in an amount of about 7.1 wt %, about 14.2 wt %, about 21.2 wt %, or about 28.3 wt % actives, based on the total weight of the tablet;

sodium chloride present in an amount of about 7.1 wt %, about 14.2 wt %, about 21.2 wt %, or about 28.3 wt % actives, based on the total weight of the tablet;

sucrose present in an amount of about 7.1 wt %, about 14.2 wt %, about 21.2 wt %, or about 28.3 wt % actives, based on the total weight of the tablet; and water in an amount of less than about 15 wt %, based on a total weight of the tablet, wherein:

the bentonite clay, sodium chloride, and sucrose are present in a weight ratio of actives of about 1:1:1, about 4:1:1, about 1:4:1, or about 1:1:4, the tablet has a hardness of at least about 20 N, and the tablet has a dissolution percentage of at least about 12% after about 5 minutes in water at a temperature of about 25° C.

2. The tablet of claim 1, wherein the tablet is formed as a briquette, a pill, a pellet, or a brick.

3. The tablet of claim 1, wherein the tablet is formed by pressing powder into the tablet using a force.

4. A tablet having improved dissolution in water, the tablet comprising:

citric acid present in an amount of about 14.8 wt % actives, based on the total weight of the tablet;

an anionic surfactant that is (1) sodium dodecylbenzene sulfonate present in an amount of about 28 wt % actives, based on the total weight of the tablet, or (2) sodium cocoyl isethionate present in an amount of about 12 wt % actives, based on the total weight of the tablet;

a filler comprising bentonite clay, sodium chloride, and sucrose, wherein the filler is present in an amount of from about 40 to about 60 wt % actives, based on the total weight of the tablet; and water in an amount of less than about 15 wt %, based on a total weight of the tablet, wherein:

the bentonite clay, sodium chloride, and sucrose are present in a weight ratio of actives of about 1:1:1, about 4:1:1, about 1:4:1, or about 1:1:4, wherein the cleaning composition has a dissolution percentage of at least about 12% after about 5 minutes in water at a temperature of about 25° C., the bentonite clay is present in an amount of about 7.1 wt %, about 14.2 wt %, about 21.2 wt %, or about 28.3 wt % actives, based on the total weight of the tablet, the sodium chloride is present in an amount of about 7.1 wt %, about 14.2 wt %, about 21.2 wt %, or about 28.3 wt % actives, based on the total weight of the tablet, and the sucrose is present in an amount of from about 7.1 wt %, about 14.2 wt %, about 21.2 wt %, or about 28.3 wt %, based on the total weight of the tablet.

5. The tablet of claim 4, wherein the filler is present in an amount of from about 40 to about 50 wt % actives, based on the total weight of the tablet.

6. The tablet of claim 4, wherein the filler is present in an amount of from about 50 to about 60 wt % actives, based on the total weight of the tablet.

7. The tablet of claim 4, wherein the tablet is formed as a briquette, a pill, a pellet, or a brick.

8. The tablet of claim 4, wherein the tablet is formed by pressing powder into the tablet using a force.

* * * * *